United States Patent
Fontenot et al.

(10) Patent No.: US 7,958,381 B2
(45) Date of Patent: Jun. 7, 2011

(54) ENERGY CONSERVATION IN MULTIPATH DATA COMMUNICATIONS

(75) Inventors: Nathan Fontenot, Georgetown, TX (US); Jacob Lorien Moilanen, Austin, TX (US); Joel Howard Schopp, Austin, TX (US); Michael Thomas Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/147,565

(22) Filed: Jun. 27, 2008

(65) Prior Publication Data
US 2009/0327779 A1    Dec. 31, 2009

(51) Int. Cl.
*G06F 1/00* (2006.01)
(52) U.S. Cl. .................. 713/323; 713/320; 365/226
(58) Field of Classification Search .................. 713/320, 713/323; 365/226
See application file for complete search history.

(56) References Cited

U.S. PATENT DOCUMENTS

| | | | | |
|---|---|---|---|---|
| 6,108,684 | A * | 8/2000 | DeKoning et al. | 718/105 |
| 6,618,814 | B1 | 9/2003 | Gaur et al. | |
| 6,704,879 | B1 | 3/2004 | Parrish | |
| 6,823,477 | B1 | 11/2004 | Cheng et al. | |
| 6,826,005 | B2 | 11/2004 | Hakamata et al. | |
| 6,968,401 | B2 | 11/2005 | McBrearty et al. | |
| 6,993,571 | B2 * | 1/2006 | Kistler | 709/218 |
| 7,058,758 | B2 | 6/2006 | Allen et al. | |
| 7,373,456 | B2 * | 5/2008 | Yamazaki et al. | 711/114 |
| 7,437,585 | B2 * | 10/2008 | Nakano et al. | 713/330 |
| 7,584,229 | B2 * | 9/2009 | Moore et al. | 707/205 |
| 2004/0068672 | A1 | 4/2004 | Fisk et al. | |
| 2005/0240786 | A1 | 10/2005 | Ranganathan | |
| 2005/0283552 | A1 | 12/2005 | Kobashi et al. | |
| 2007/0208921 | A1 * | 9/2007 | Hosouchi et al. | 711/170 |
| 2008/0104204 | A1 * | 5/2008 | Moore et al. | 709/219 |
| 2008/0104355 | A1 * | 5/2008 | Moore et al. | 711/170 |

FOREIGN PATENT DOCUMENTS

| | | |
|---|---|---|
| JP | 2000-293314 | 10/2000 |
| JP | 2001-093220 | 4/2001 |
| JP | 2002-297320 | 10/2002 |
| JP | 2003-051176 | 2/2003 |
| JP | 2004-252988 A | 9/2004 |

(Continued)

OTHER PUBLICATIONS

Japan Office Action dated May 11, 2010.

(Continued)

*Primary Examiner* — Chun Cao
(74) *Attorney, Agent, or Firm* — Shimokaji & Associates, P.C.

(57) ABSTRACT

A method, system, and computer usable program product for energy conservation in multipath data communications are provided in the illustrative embodiments. A current utilization of each of several of I/O devices is determined. A violation determination is made whether an I/O device from the several I/O devices can be powered down without violating a rule. The I/O device is powered down responsive to the violation determination being false. A powering up determination may be made whether an additional I/O device is needed in a multipath I/O configuration. The I/O device may be located, powered up, and made available for multipath I/O configuration. A latency determination may be made whether a latency time of the I/O device can elapse before the time when the additional I/O device is needed. The powering on may occur no later than the latency time before the time the additional I/O device is needed.

20 Claims, 5 Drawing Sheets

FOREIGN PATENT DOCUMENTS

| | | |
|---|---|---|
| JP | 2005-539303 | 12/2005 |
| JP | 2007-266816 | 10/2007 |
| JP | 2008-015662 | 1/2008 |
| JP | 2007-086941 | 4/2008 |
| WO | WO 98/28686 A | 7/1998 |
| WO | WO 2006098036 | 9/2006 |
| WO | WO 2008/012483 A | 1/2008 |

OTHER PUBLICATIONS

Extended European Search Report dated Sep. 4, 2009.

Japan Office Action dated Oct. 12, 2010, Patent application 2008-273948.

* cited by examiner

ENERGY CONSERVATION IN MULTIPATH DATA COMMUNICATIONS

BACKGROUND OF THE INVENTION

1. Field of the Invention

The present invention relates generally to an improved data processing system, and in particular, to a computer implemented method for multipath data communications. Still more particularly, the present invention relates to a computer implemented method, system, and computer usable program code for energy conservation in multipath data communications.

2. Description of the Related Art

Data processing systems can be divided into logical partitions (LPAR). A logical partition is also known simply as a "partition". Each partition operates as a separate data processing system independent of the other partitions. Generally, a partition management firmware connects the various partitions and provides the network connectivity among them. Hypervisor is an example of such partition management firmware.

A partition may access one or more data storage devices for reading, writing, storing, and managing data. In some partitioned data processing systems, virtual input/output (I/O) servers provide the partitions access to one or more data storage devices. A data storage device may include one or more physical data storage units, such as hard disks, as in the case of a storage array, or a storage area network (SAN).

A partition, with or without the use of a virtual I/O server may access a particular data storage device over more than one data communication paths. Data communications conducted between a partition and a data storage device over more than one data communication paths are called multipath input/output (multipath I/O).

A partition utilizing multipath I/O may use multiple I/O adapters to communicate with the data storage device. Each I/O adapter communicates with the data storage device over a separate data network. Multipath I/O configurations are commonly employed in partitioned data processing system for increasing the data throughput rates between a partition and a data storage device. Multipath I/O configurations also improve the reliability of the data communications between a partition and a data storage device by providing redundant data communication paths between them.

SUMMARY OF THE INVENTION

The illustrative embodiments provide a method, system, and computer usable program product for energy conservation in multipath data communications. A current utilization of each of several of I/O devices is determined. A determination is made, forming a violation determination, whether an I/O device from the several I/O devices can be powered down without violating a rule. The I/O device is powered down responsive to the violation determination being false.

A determination may be made, forming a power up determination, whether an additional I/O device is needed in a multipath I/O configuration. The I/O device may be located. The I/O device may be powered up. The I/O device may be made available for multipath I/O configuration. A user may be notified responsive to a failure in locating the I/O device.

A time when the additional I/O device is needed may be determined. A determination may be made, forming a latency determination, whether a latency time of the I/O device can elapse before the time when the additional I/O device is needed. The I/O device may be powered on responsive to the latency determination being true. In one embodiment, the powering on may occur no later than the latency time before the time the additional I/O device is needed.

The power up determination may further include receiving a request for the additional I/O device, or forecasting the need for the additional I/O device. The violation determination may further include executing a rule, executing a system policy, or executing a configuration. Powering down may further include triggering, based on a rule, a logic to power down the I/O device.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The illustrative embodiments described herein provide a method, system, and computer usable program product for energy conservation in multipath data communications. The illustrative embodiments are sometimes described herein using partitions and particular partition technologies only as an example for the clarity of the description. The illustrative embodiments may be used for managing multipath I/O in the manner described in a variety of data processing systems. For example, a non-partitioned system that employs multipath I/O configurations may use the illustrative embodiments in the manner described here within the scope of the illustrative embodiments.

The illustrative embodiments recognize that presently available multipath I/O solutions use all or most of the configured I/O devices, such as network adapters, for I/O between the data processing system and the data storage device. Furthermore, presently available multipath I/O solutions often underutilize the multiple I/O devices. The underutilization occurs because, generally, the I/O devices and the associated data networks collectively have more data carrying capacity than the partition or the data processing system requires.

The illustrative embodiments recognize that the present way of using multipath I/O is wasteful of computing resources and wasteful of energy. As an example, in a typical multipath data communication configuration, some of the I/O devices may remain operational but may communicate no data what so ever. Being operational is being in a powered-on state and being ready to perform a designated function. By being operational, an I/O device consumes electrical power. However, as the illustrative embodiments recognize, that electrical power is being wasted in those network adapter that may not be engaged in data communication.

Furthermore, the illustrative embodiments recognize that even if some I/O devices may be engaged in data communications in a multipath I/O configuration, the data communication can be so adjusted as to free up those I/O devices. For example, one I/O device may be utilizing only 20 percent of its data communication capacity. A second I/O device may be utilizing 40 percent of its data communication capacity. The I/O devices are therefore powered-up and consuming all the power they need to be operational, but are utilized only partially. The illustrative embodiments recognize that the electrical power is again being wastefully consumed in such I/O devices.

To address these and other problems related to sending emails to groups of recipients, the illustrative embodiments provide a method, system, and computer usable program product for energy conservation in multipath data communications. According to the illustrative embodiments, the data communication of the first I/O device may be transferred to the second I/O device. The transferred data communication may increase the utilization of the second I/O device, reduce the utilization of the first I/O device to zero, and the first I/O device may not be engaged in data communication anymore.

The illustrative embodiments further provide ways of powering down unused I/O adapters. Powering down an unused I/O adapter according to the illustrative embodiments conserves energy without impairing the data communication abilities of a data processing system, and without sacrificing the goals of multipath data communication systems.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
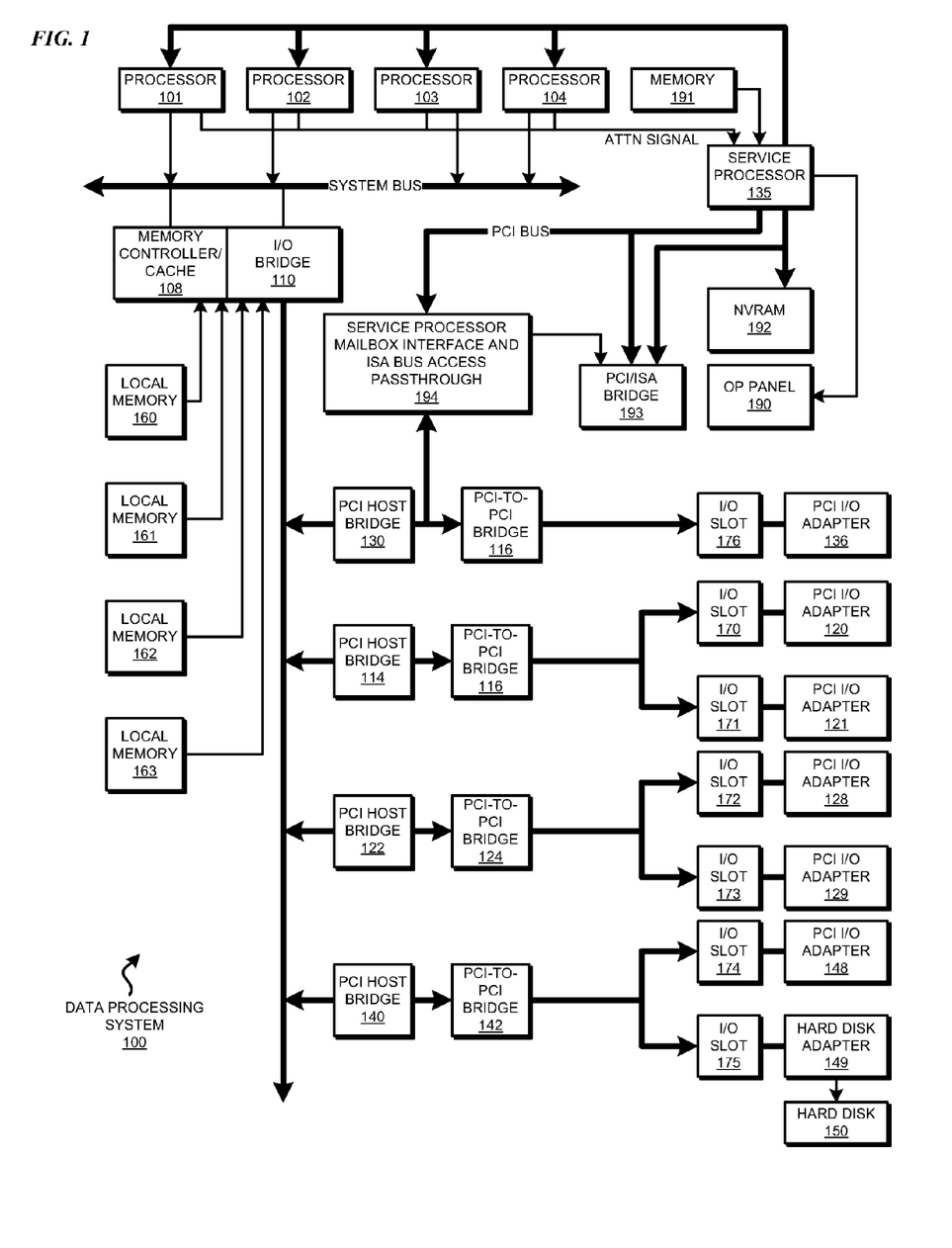
FIG. 1 depicts a block diagram of a data processing system in which the illustrative embodiments may be implemented is depicted.
Figure 2:
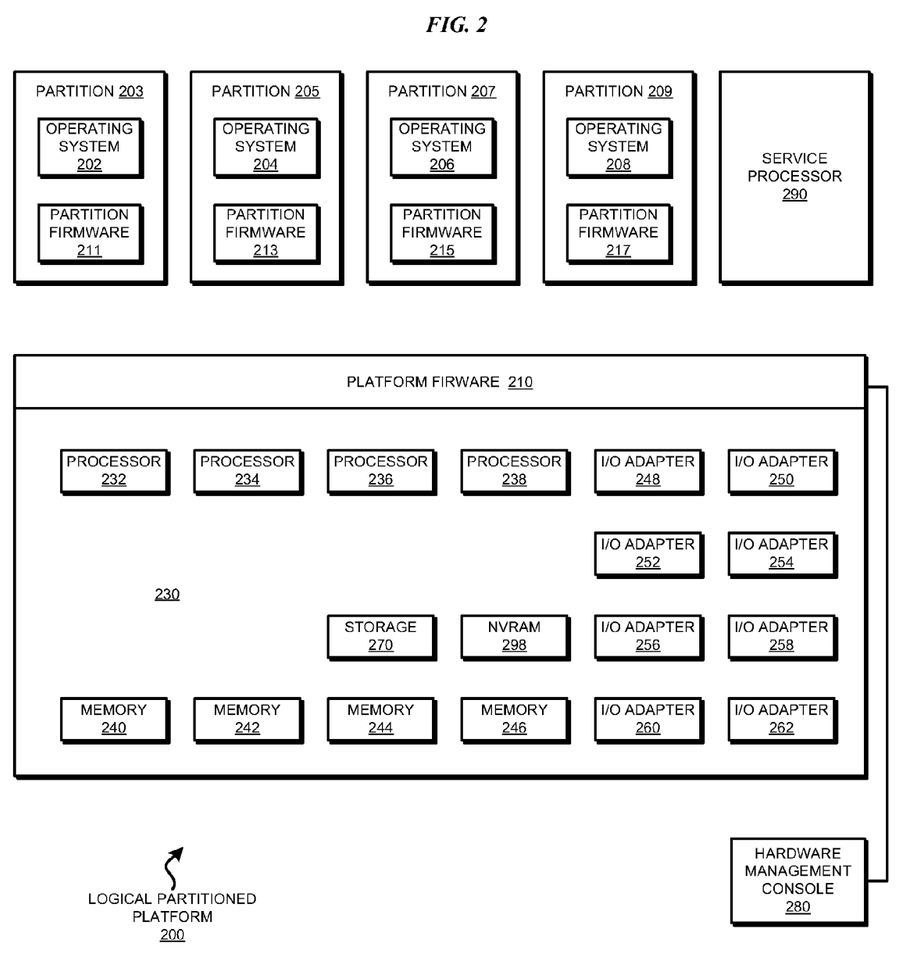
FIG. 2 depicts a block diagram of an exemplary logical partitioned platform is depicted in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM eServer® implemented as a server within a network. (eServer is a product and e(logo)server is a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or OS/400® operating system may be operating within logical partition P3. (AIX and OS/400 are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, a block diagram of an exemplary logical partitioned platform is depicted in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the illustrative embodiments.

The depicted examples in FIGS. 1-2 and above-described examples are not meant to imply architectural limitations. For example, data processing system 200 may be replaced with non partitioned data processing system for practicing the illustrative embodiments within the scope of the illustrative embodiments. Furthermore, the non-partitioned data processing system may be a tablet computer, laptop computer, or telephone device in addition to taking the form of a PDA. These example of an alternative data processing system may include multiple network adapters or radio communication devices that may operate in a manner similar to multipath I/O configuration. The illustrative embodiments may therefore be applied to these data processing systems in the manner described in this disclosure.

Figure 3:
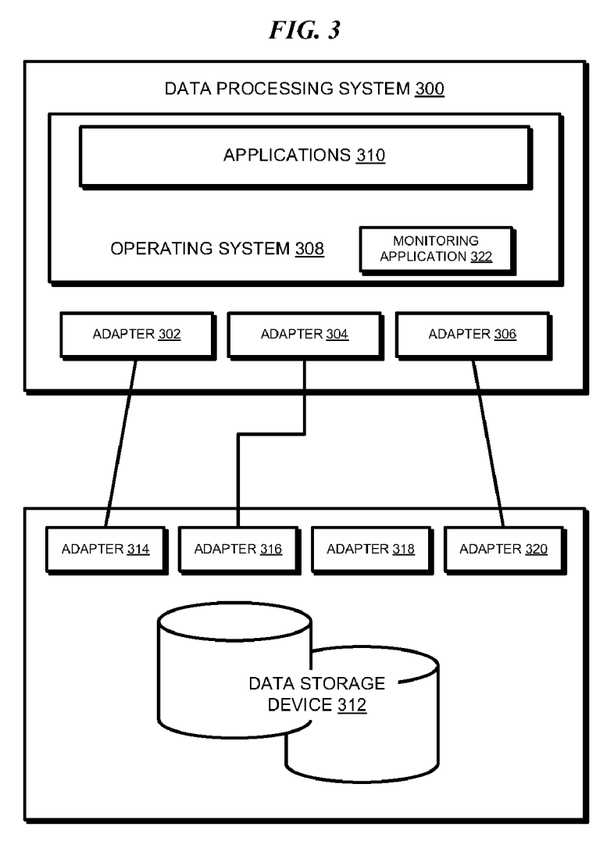
FIG. 3 depicts a block diagram of monitoring multipath data communications in accordance with an illustrative embodiment.

With reference to FIG. 3, this figure depicts a block diagram of monitoring multipath data communications in accordance with an illustrative embodiment.

Data processing system 300 may be a partition, such as logical partition 203 in FIG. 2. Alternatively, data processing system 300 may be the entire logical partition platform 200 in FIG. 2. Alternatively, data processing system 300 may be implemented in any type computer such as a client or a server data processing system that uses multipath data communications.

Data processing system 300 may include several I/O devices, such as physical network adapters for data communication over Ethernet. Adapters 302, 304, and 306 are examples of such I/O devices. Data processing system 300 may also include devices usable for radio communications, such as radio transceivers, as I/O devices in place of or in combination with adapters 302, 304, and 306.

Data processing system 300 further includes operating system 308. One or more applications 310 may execute on data processing system 300.

Data processing system 300 may communicate with data storage device 312 in a multipath data communication configuration. Data storage device 312 may include several I/O devices as well. Adapters 314, 316, 318, and 320 are examples of such I/O devices, and may take the form of network adapters, radio transceivers, or a combination thereof. Adapters 314, 316, 318, and 320 allow data processing system 312 or participate in data communications with data processing system 300 and other data processing systems over several data networks.

In this example figure, data processing system 300 communicates with data storage device 312 using multipath data communications. The multipath data communication is established by configuring adapters 302, 304, 306, to communicate with adapters 314, 316, and 320 respectively.

In accordance with an illustrative embodiment, monitoring application 322 monitors the utilization of adapters 302, 304 and 306 in data processing system 300. Monitoring application 322 may further monitor the demand for data communication capacity from operating system 308.

Figure 4:
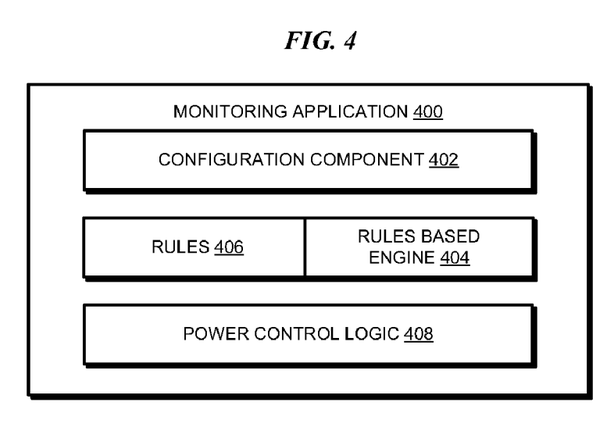
FIG. 4 depicts a block diagram of a monitoring application in accordance with an illustrative embodiment.

With reference to FIG. 4, this figure depicts a block diagram of a monitoring application in accordance with an illustrative embodiment. Monitoring application 400 may be implemented as monitoring application 322 in FIG. 3.

Monitoring application 400 may include configuration component 402. Configuration component 402, for example, may permit a user to configure the operation of monitoring application 400. As another example, configuration component 402 may allow data processing system where monitoring application 400 may be executing, such as data processing system 300 in FIG. 3, to establish criteria, conditions, or parameters under which monitoring application 400 may execute.

Monitoring application 400 may further include rules based engine 404 that may process rules 406. In one embodiment, rules 406 may derive from configurations described in configuration component 402. For example, a user may specify in configuration component 402 that the total number of physical network adapters active at any time cannot be less than 2. This specification from configuration component 402 may be translated into a rule in rules 406 that rules based engine 404 may execute.

In another embodiment, a rule in rules 406 may derive from, inherit from, result from, depend on, or be otherwise based on a system wide policy in the data processing system where monitoring application 400 may execute. For example, a system policy may specify that a network adapter's utilization may not exceed 80 percent for more than 5 minutes. This system policy may translate to a rule in rules 406 that rules based engine 404 may execute.

Furthermore, a rule in rules 406 may describe how to transfer a data communication from one I/O device to another thereby reducing the utilization of one I/O device and increasing the utilization of the other I/O device.

A rule in rules 406 may also specify under what circumstances and using what procedure a powered-off I/O device may be powered on again. A rule in rules 406 may specify the steps to take to make additional I/O devices powered on and available, when the operating system demands an increased data communication capacity or higher data communications availability. A rule in rules 406 may also specify how to forecast an increased data communications load and predictively power on an I/O device before the increased data communications need arises.

The examples of the rules in rules 406 are described here only for the clarity of the description and are not limiting on the illustrative embodiments. Many other types of actions and configurations of rules will become apparent from this disclosure. Such additional rules are contemplated within the scope of the illustrative embodiments. Furthermore, the relative interactions of configuration component 402, rules based engine 404, and rules 406 are also described only as an example for clarity, without imposing any limitations thereby on the illustrative embodiments. A particular implementation of the illustrative embodiments may achieve similar functionality through alternative components without departing from the scope of the illustrative embodiments.

Returning to the description of the figure, monitoring application 400 may further include power control logic 408. Power control logic 408 may receive instructions from rules based engine 404 to turn on or off a particular I/O device, such as any of adapters 302, 304, Or 306 in FIG. 3. Furthermore, power control logic 408 may be configured to perform certain steps for transferring certain data communication from one I/O device to another to reduce the utilization of a particular I/O device before powering that I/O device off.

The depicted components of monitoring application 400 are not exhaustive. The depicted components have been selected to describe the functionality of an illustrative embodiment and not as a limitation of the illustrative embodiment. A particular implementation may include additional or different components in monitoring application 400 without departing from the scope of the illustrative embodiments.

Figure 5:
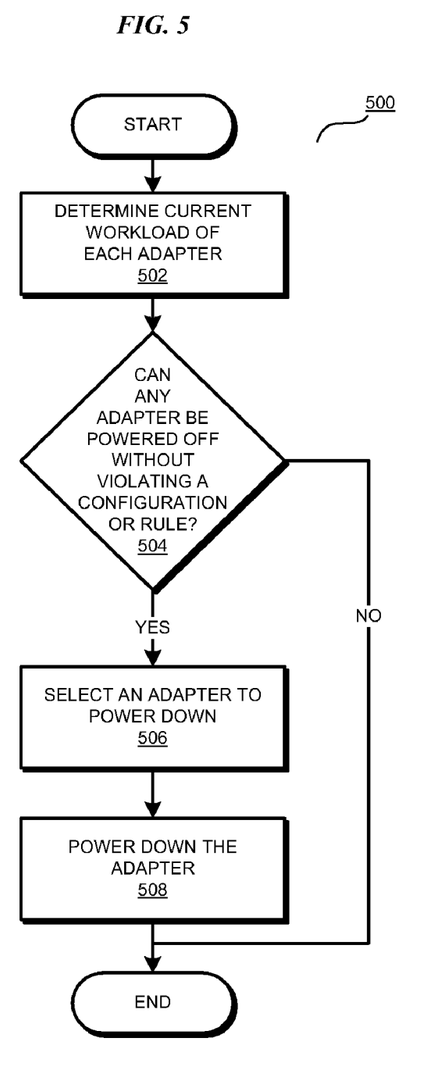
FIG. 5 depicts a flowchart of a process of conserving energy in a multipath data communication configuration in accordance with an illustrative embodiment.

With reference to FIG. 5, this figure depicts a flowchart of a process of conserving energy in a multipath data communication configuration in accordance with an illustrative embodiment. Process 500 may be implemented in monitoring application 400 in FIG. 4. Furthermore, process 500 is described with respect to an adapter embodiment of an I/O device only as an example. The adapter described in process 500 is not limiting on the illustrative embodiments and any suitable I/O device may be used in conjunction with process 500.

Process 500 begins by determining a current workload or utilization of each adapter configured in a multipath data communication configuration (step 502). Process 500 determines if any adapter can be powered off without violating a configuration or rule (step 504). In conjunction with making the determination of step 504, process 500 may perform additional steps for transferring workload from one adapter to another to free up an adapter in the manner described above.

If process 500 determines that an adapter can be powered off ("Yes" path of step 504), process 500 may determine that multiple adapters are candidates for powering down. Process 500 selects an adapter to power down (step 506).

To power down a device is to fully or partially turn off the device. For example, some devices may still draw power even when substantial power to the device has been turned off and substantial functionality of the device has ceased. A power down mode of a device is the state of the device when the device has been powered down. Conversely, to power up a device is to supply power to a device to enable substantial functionality of the device. A power up mode of a device is the state of the device where the device is receiving sufficient power to perform substantial portion of the device's functions.

Process 500 powers down the selected adapter (step 508). Process 500 ends thereafter. If process 500 determines that an adapter cannot be powered off ("No" path of step 504), process 500 ends thereafter as well.

Figure 6:
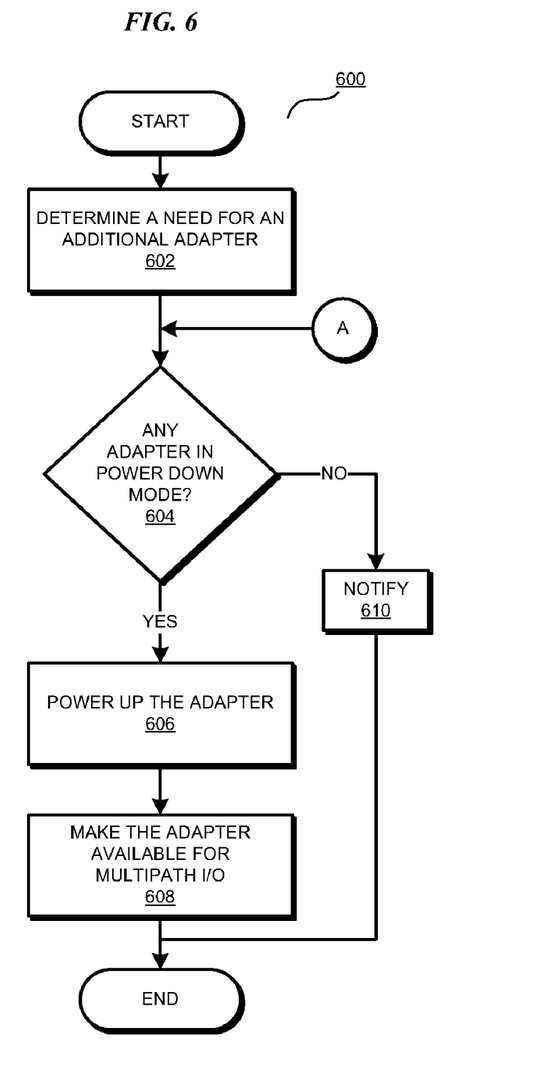
FIG. 6 depicts a flowchart of a process of restarting an I/O device in accordance with an illustrative embodiment.

With reference to FIG. 6, this figure depicts a flowchart of a process of restarting an I/O device in accordance with an illustrative embodiment. Process 600 may be implemented in monitoring application 400 in FIG. 4. As in FIG. 5, process 600 also uses an adapter as an example of an I/O device only for illustration purposes.

Figure 7A:
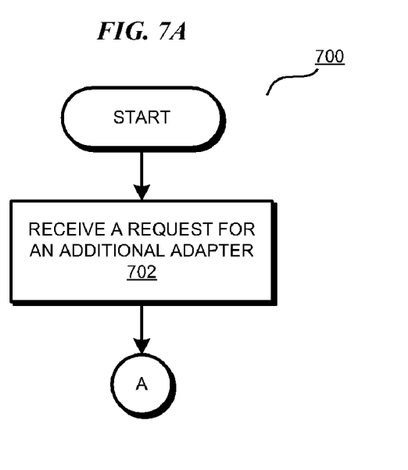
FIG. 7A depicts a flowchart of one process of determining a need for increased data communication in accordance with an illustrative embodiment.
Figure 7B:
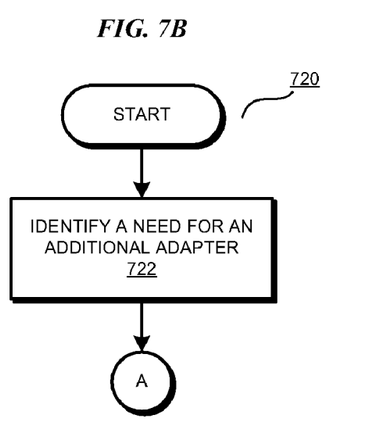
FIG. 7B depicts a flowchart of another process of determining a need for increased data communication in accordance with an illustrative embodiment.

Process 600 begins by determining a need for an additional adapter (step 602). Process 600 may determine the need in at least two ways, as depicted in FIGS. 7A and 7B.

When process 600 determines in step 602 that a need for an additional adapter is present or likely to be arise in a predetermined interval, process 600 determines if any adapter is in a power down mode (step 604). In one embodiment, process 600 may determine if an adapter is available in power down mode whose latency time is less than the interval between the time of the determination of step 602 and the time when the need is to arise.

If process 600 identifies a suitable adapter ("Yes" path of step 604), process 600 powers up that adapter (step 606). Process 600 makes the adapter available for multipath data communication (step 608). Process 600 ends thereafter.

If the need for increased data communication has arisen or is likely to arise, and no suitable adapter is available in power down mode ("No" path of step 604), process 600 notifies a user (step 610). Process 600 ends thereafter. In one embodiment, process 600 may notify a system in step 610. In another embodiment, process 600 may log a message in step 610. Process 600 may execute any suitable alternative to the depicted step 610 at step 610 without departing from the scope of the illustrative embodiment.

With reference to FIG. 7A, this figure depicts a flowchart of one process of determining a need for increased data communication in accordance with an illustrative embodiment. Process 700 may be implemented as step 602 in FIG. 6.

Process 700 may receive a request for an additional adapter (step 702). For example, in performing step 702, process 700 may receive an instruction from an operating system that the operating system needs increased data communication capacity that can be fulfilled by adding an additional adapter to the multipath I/O configuration. Process 700 may proceed to step 604 of process 600 in FIG. 6 (entry point A). Process 700 terminates when process 600 terminates thereafter.

With reference to FIG. 7B, this figure depicts a flowchart of another process of determining a need for increased data communication in accordance with an illustrative embodiment. Process 720 may be implemented as step 602 in FIG. 6.

Process 720 may identify a need for an additional adapter (step 722). As an example, in performing step 722, process 700 may predict or forecast an increased need at some future time that can be fulfilled by adding an additional adapter to a multipath I/O configuration.

In one embodiment, for such a forecast, process 720 may include into consideration the latency time of powering up an adapter. For example, a period of 5 seconds may elapse between powering on a particular adapter and that adapter becoming available for data communications. Such a time interval from the time of powering on an I/O device to the time the I/O device becomes available is called the I/O device's latency time. Process 720 may consider such latency times in step 722 in forecasting whether a need for an additional adapter is likely to arise within the latency time of any powered down adapter. Process 800 in FIG. 8 illustrates one example process of forecasting including latency in detail.

Process 720 may proceed to step 604 of process 600 in FIG. 6 (entry point A). Process 720 terminates when process 600 terminates thereafter. Processes 700 and 720 also use an adapter as an example of an I/O device only for illustration purposes.

Figure 8:
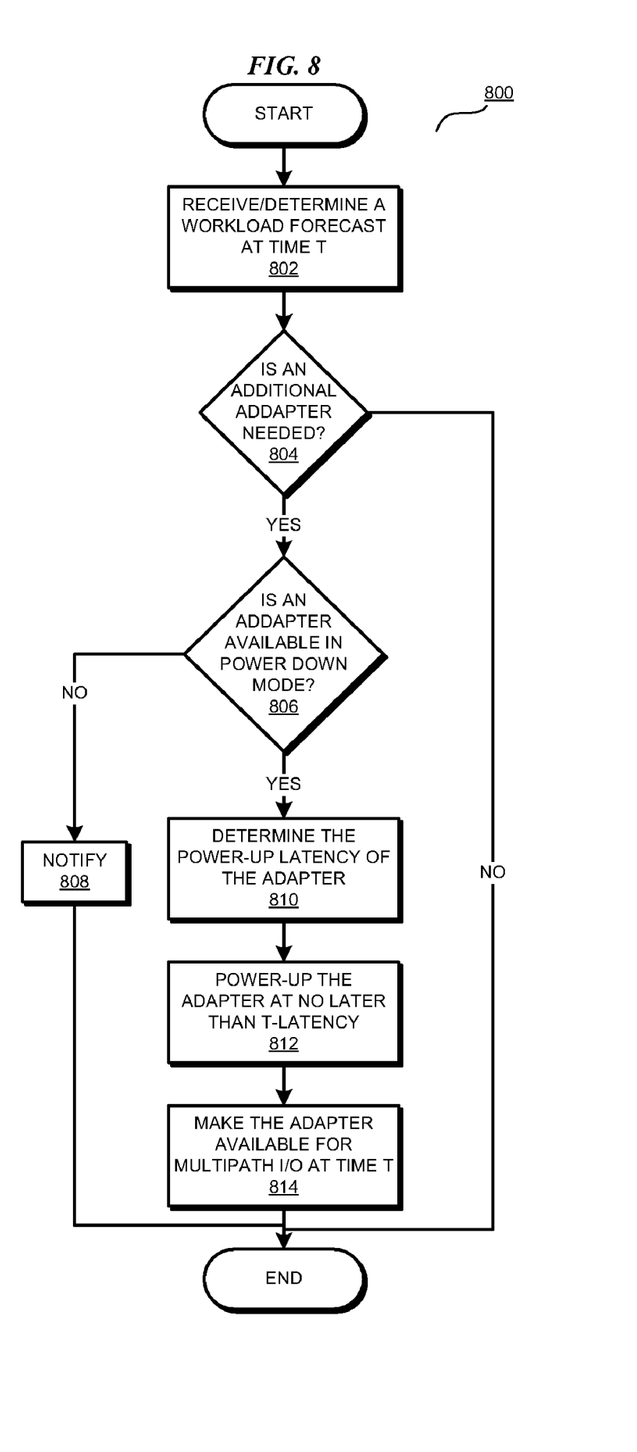
FIG. 8 depicts a flowchart of a process of managing a multipath data communication workload using I/O device latency in accordance with an illustrative embodiment.

With reference to FIG. 8, this figure depicts a flowchart of a process of managing a multipath data communication workload using I/O device latency in accordance with an illustrative embodiment. Process 800 may be implemented as a combination of step 722 in FIG. 7B and process 600 in FIG. 6. Process 800 also uses an adapter as an example of an I/O device only for illustration purposes. Process 800 may be implemented with any type of I/O device within the scope of the illustrative embodiments.

Process 800 begins by receiving or determining a workload forecast at a future time "T" (step 802). Process 800 determines if an additional adapter may have to be added to the multipath configuration at time T (step 804). If process 800 determines that an additional adapter may not be needed ("No" path of step 804), process 800 may end.

If, however, process 800 determines that an additional adapter may have to be added ("Yes" path of step 804), process 800 determines if an adapter is available in power down mode (step 806). If process 800 determines that an adapter is not available in power down mode but one is needed ("No" path of step 806), process 800 may notify or take another action similar to step 610 in FIG. 6 (step 808). Process 800 may end thereafter.

If process 800 determines that an adapter is available in power down mode ("Yes" path of step 806), process 800 may determine the power-up latency of the adapter (step 810). Process 800 may select only such an adapter in step 806 whose latency time can elapse before the time for the need of step 802 arrives. If all available adapters have latency times that may not fully elapse by then, process 800 may proceed on the "No" path of step 806 as if no adapter is available to meet the need.

Process 800 may power up the adapter at a time no later than T minus the latency time (step 812). Process 800 may make the adapter available for multipath data communication at or before time T (step 814). Process 800 ends thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for energy conservation in multipath data communications. Using the illustrative embodiments, a data processing system may selectively power on and off I/O devices configured for multipath data communications. The data processing system may be able to redistribute data communication workload among the operating I/O devices and power off one or more I/O devices to conserve energy without adversely affecting data communication throughput or reliability.

Illustrative embodiments are flexible in re-enabling powered down I/O devices depending on the changing data communication needs. Some embodiments may be used to power up I/O devices based on a forecast of impending increase in data communication throughput or reliability.

In some implementations, the illustrative embodiments may allow turning off all but one I/O device under certain circumstances to conserve power. In other implementations, the illustrative embodiments may allow turning off all but at least two I/O devices to maintain redundancy. A particular implementation of the illustrative embodiments may set any threshold number of I/O devices that must remain operative at any given time. This condition and other configuration related conditions may be implemented using rules and rules based engine in the illustrative embodiments.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for energy conservation in multipath data communications, the computer implemented method comprising:
    determining a current utilization of each of a plurality of I/O devices;
    determining whether an I/O device in the plurality of I/O devices can be powered down without violating a rule, forming an indication of violation;
    powering down the I/O device responsive to the indication of violation being false; and
    determining whether a latency time of the I/O device elapses before a time when an additional I/O device is needed, wherein the determination of a time when the additional I/O device is needed arises within the latency time of the I/O device.

2. The computer implemented method of claim 1, further comprising:
    determining whether an additional I/O device is needed in a multipath I/O configuration, forming an indication of powering up;
    specifying a maximum utilization of one of the plurality of I/O devices during a specified time period;
    locating the additional I/O device;
    powering up the additional I/O device; and
    making the additional I/O device available for multipath I/O configuration.

3. The computer implemented method of claim 2, further comprising:
    determining a time when the additional I/O device is needed; and
    powering on the I/O device within the latency time of the I/O device.

4. The computer implemented method of claim 3, wherein the powering on occurs no later than the latency time before the time the additional I/O device is needed.

5. The computer implemented method of claim 2, wherein the determining that forms the indication of powering up further comprises one of (i) receiving a request for the additional I/O device and (ii) forecasting the need for the additional I/O device.

6. The computer implemented method of claim 2, further comprising:
    notifying a user responsive to a failure in locating the I/O device.

7. The computer implemented method of claim 1, wherein the determining that forms the indication of violation further comprises one of (i) executing a rule, (ii) executing a system policy, and (iii) executing a configuration.

8. The computer implemented method of claim 1, the powering down further comprising:
    triggering, based on a rule, a logic to power down the I/O device.

9. A computer usable program product comprising a computer storage medium including computer usable code for energy conservation in multipath data communications, the computer usable code comprising:
    computer usable code for determining a current utilization of each of a plurality of I/O devices;
    computer usable code for determining whether an I/O device in the plurality of I/O devices powers down without violating a rule, forming an indication of violation;
    computer usable code for powering down the I/O device responsive to the indication of violation being false, the computer usable code for powering down including computer usable code for triggering, based on a rule, a logic to power down the I/O device; and
    computer usable code for determining whether a latency time of the I/O device elapses before a time when an additional I/O device is needed, wherein the determination of a time when the additional I/O device is needed arises within the latency time of the I/O device.

10. The computer usable program product of claim 9, further comprising:
    computer usable code for determining whether an additional I/O device is needed in a multipath I/O configuration, forming an indication of powering up;
    computer usable code for locating the I/O device;
    computer usable code for powering up the I/O device;
    computer usable code for making the I/O device available for multipath I/O configuration; and
    computer usable code for notifying a user responsive to a failure in locating the I/O device.

11. The computer usable program product of claim 10, further comprising:
    computer usable code for determining a time when the additional I/O device is needed; and
    computer usable code for powering on the I/O device within the latency time of the I/O device.

12. The computer usable program product of claim 11, wherein the powering on occurs no later than the latency time before the time the additional I/O device is needed.

13. The computer usable program product of claim 10, wherein the computer usable code for the determining that forms the indication of powering up further comprises computer usable code for one of (i) receiving a request for the additional I/O device and (ii) forecasting the need for the additional I/O device.

14. The computer usable program product of claim 9, wherein the computer usable code for the determining that forms the indication of violation further comprises computer usable code for one of (i) executing a rule, (ii) executing a system policy, and (iii) executing a configuration.

15. A data processing system for energy conservation in multipath data communications, the data processing system comprising:
    a storage device including a storage medium, wherein the storage device stores computer usable program code; and
    a processor, wherein the processor executes the computer usable program code, and wherein the computer usable program code comprises:
    computer usable code for determining a current utilization of each of a plurality of I/O devices;

computer usable code for determining whether an I/O device in the plurality of I/O devices can be powered down without violating a rule, forming an indication of violation; and computer usable code for powering down the I/O device responsive to the indication of violation being false, the computer usable code for powering down including computer usable code for triggering, based on a rule, a logic to power down the I/O device; and computer usable code for determining whether a latency time of the I/O device elapses before a time when an additional I/O device is needed, wherein the determination of a time when the additional I/O device is needed arises within the latency time of the I/O device.

16. The data processing system of claim 15, further comprising:

computer usable code for determining whether an additional I/O device is needed in a multipath I/O configuration, forming an indication of powering up;

computer usable code for locating the I/O device;

computer usable code for powering up the I/O device based on a forecast of an impending increase in reliability of the data processing system;

computer usable code for making the I/O device available for multipath I/O configuration; and computer usable code for notifying a user responsive to a failure in locating the I/O device.

17. The data processing system of claim 16, further comprising:

computer usable code for determining a time when the additional I/O device is needed; and computer usable code for powering on the I/O device within the latency time of the I/O device.

18. The data processing system of claim 17, wherein the powering on occurs no later than the latency time before the time the additional I/O device is needed.

19. The data processing system of claim 16, wherein the computer usable code for the determining that forms the indication of powering up further comprises computer usable code for one of (i) receiving a request for the additional I/O device and (ii) forecasting the need for the additional I/O device.

20. The data processing system of claim 15, wherein the computer usable code for the determining that forms the indication of violation further comprises computer usable code for one of (i) executing a rule, (ii) executing a system policy, and (iii) executing a configuration.

* * * * *